(No Model.) 2 Sheets—Sheet 1.

W. O. TALCOTT.
MACHINE FOR MAKING SHEET METAL BELT FASTENERS.

No. 525,123. Patented Aug. 28, 1894.

Witnesses
Fred Arnold
Ida M. Warren

Inventor
Walter O. Talcott
by Remington & Henthorn
Attorneys (No Model.) 2 Sheets—Sheet 2.
W. O. TALCOTT.
MACHINE FOR MAKING SHEET METAL BELT FASTENERS.
No. 525,123. Patented Aug. 28, 1894.
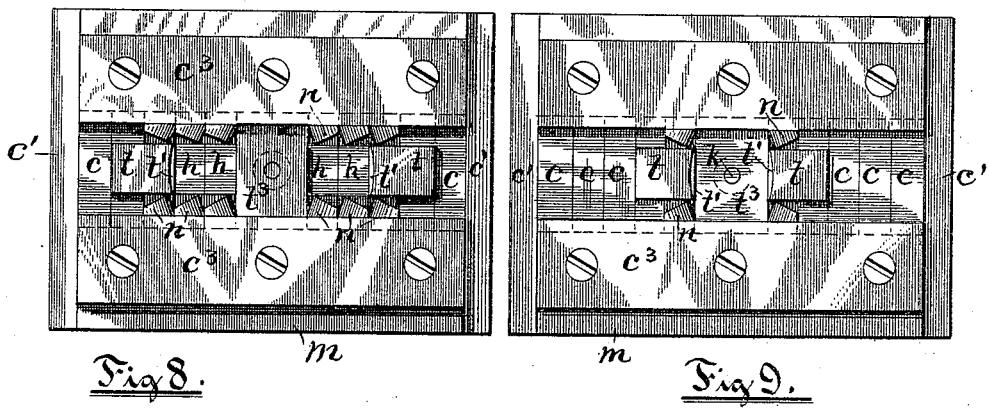
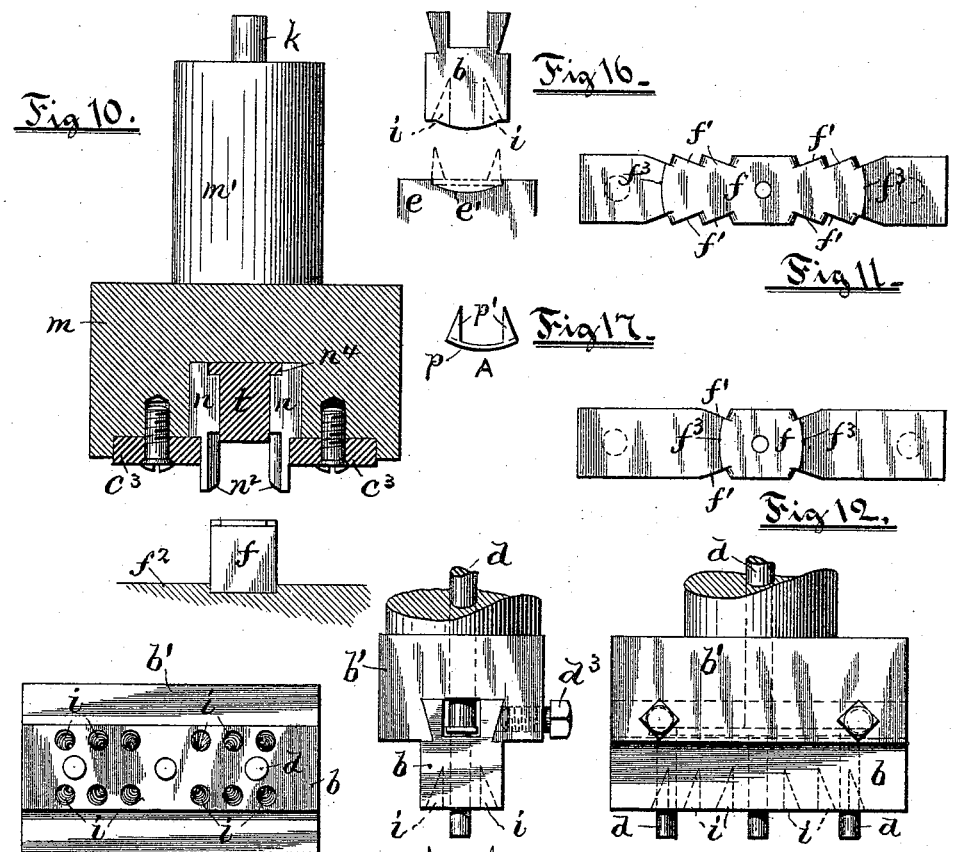
Witnesses.
Fred Arnold
Ida M. Warren
Inventor.
Walter O. Talcott
by Remington & Henthorn
Attorneys.

UNITED STATES PATENT OFFICE.

WALTER O. TALCOTT, OF PROVIDENCE, RHODE ISLAND.

MACHINE FOR MAKING SHEET-METAL BELT-FASTENERS.

SPECIFICATION forming part of Letters Patent No. 525,123, dated August 28, 1894.

Application filed April 4, 1894. Serial No. 506,337. (No model.)

*To all whom it may concern:*

Be it known that I, WALTER O. TALCOTT, a citizen of the United States, residing at Providence, in the county of Providence and State of Rhode Island, have invented certain new and useful Improvements in Methods of and Machines for Making Sheet-Metal Belt-Fasteners; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to improvements in the manufacture of sheet-metal belt-fasteners. In United States Patent No. 503,035, granted to E. L. Budlong August 8, 1893, are described and claimed certain improvements pertaining to the manufacture of a sheet-metal belt-fastener, or belt-hook. I have devised a different and simpler method of producing the belt-fastener just referred to. By means of my present improvements the number of steps or operations hitherto employed in the process of making the fasteners have been greatly reduced; fewer dies or tools are used; the latter are less expensive to make owing to their comparative simplicity and adaptability to adjustment, and the output or product of the mechanism is increased, it at the same time being more uniform in quality.

In carrying out my invention, the improvement consists essentially in feeding a continuous strip of sheet-stock having a width just equal to that of the fastener to be produced, then at one operation shearing or slitting the edges of the stock, bending such cut portion downwardly at substantially right angles to form teeth and severing the thus acted upon portion from the parent strip, and then inclining the teeth from the plane of the perpendicular.

It also consists in certain novel constructions of the dies, all as will be more fully hereinafter set forth and claimed.

Figure 1:
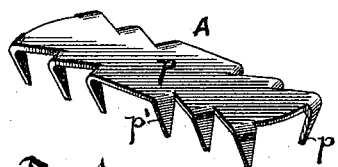
Figure 3:
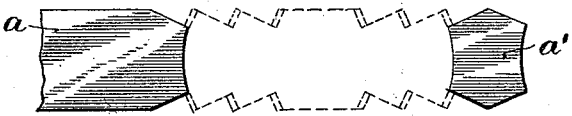
Figure 2:
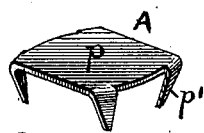
Figure 4:
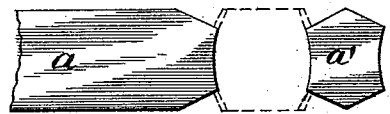
Figure 7:
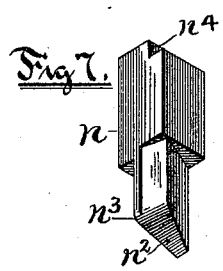
Figure 5:
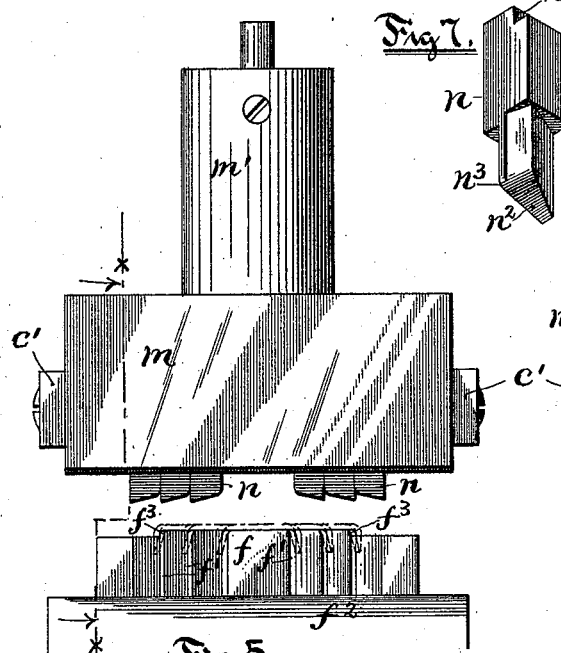
Figure 6:
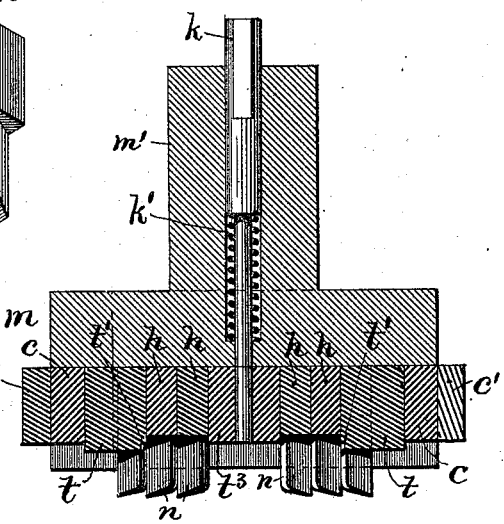

In the appended two sheets of drawings, Figures 1 and 2, Sheet 1, are perspective views of sheet-metal belt-fasteners ready for use, as produced by my improved dies, &c. Figs. 3 and 4 are corresponding views of the ends of the pieces of stock from which the fasteners were formed. Fig. 5 is a side view of male and female dies adapted to produce the fastener complete at one operation from the stock strip, except the final bending of the teeth past the plane of the perpendicular. Fig. 6 is a longitudinal sectional view, taken through the center of the male or movable die. Fig. 7 is a perspective view of one of the cutter teeth removed from the die. Fig. 8, Sheet 2, is an inverted plan view of said die, arranged to form the multi-pronged fastener indicated in Fig. 3. Fig. 9 is a similar view of the die corresponding with Fig. 4. Fig. 10 is a transverse sectional view, taken on line $x$ $x$ of Fig. 5. Figs. 11 and 12 are plan views of the bottom or female dies, corresponding with Figs. 8 and 9, respectively. Fig. 13 is a side view of the final bending die, for hooking or inclining the teeth from the plane of a perpendicular. Fig. 14 is an end view of the same, combined with the bottom die. Fig. 15 is an inverted plan view of the final bending die. Fig. 16 is an end view, corresponding with Fig. 14, but showing the dies arranged to bend the fastener base simultaneously with the bending of the teeth, and Fig. 17 is an end view of the thus bent fastener.

In the patent before referred to, the construction and arrangement of the series of dies were adapted to produce the fasteners progressively, that is the first set of dies were employed to punch a fastener-blank from the stock, the blank being next transferred to other dies for slitting it and partially bending such slitted portion to form semi-teeth or prongs, next by means of still other dies the teeth were bent at substantially right angles with the plane of the fastener base, when, finally, the prongs were bent or inclined from the plane of the perpendicular by another pair of dies. Thus it will be seen that in the said patented method and mechanisms it was necessary to first produce fastener-blanks which were subsequently transformed by several successive steps into the finished fastener; such operations requiring a corresponding series of dies and the increased amount of handling incident thereto.

In the present invention the strip of sheet-metal $a$, having a width just equal to that of the fastener to be produced is fed, by hand or in any other manner, to the first pair of suitably mounted dies $m$, $f$. The top or working face of the lower or female die $f$ is raised slightly, terminating in the curved ends $f^3$ and forming with the corresponding members $t'$ of the male die shears or cutters for severing the fastener from the strip; said parts being so arranged that they also serve at the same time to detach the waste piece of stock $a'$ (Figs. 3 and 4) from the fastener. The sides of the die $f$ are serrated and arranged to form cutting edges $f'$, the latter forming the counterpart of the fastener prongs, see Figs. 11 and 12.

The male member $m$ of the pair of dies just referred to is provided with a shank $m'$ thus adapting it to be secured in any suitable press having a reciprocating stroke. The die $m$ is planed out longitudinally on its under side to receive the center piece $t^3$ having a form substantially like the center portion of the fastener-plate or base $p$. The die is provided with a series of cutters $n$, interchangeably alike, the lower end $n^2$ being beveled or inclined, gradually increasing in width and terminating in the rounded heel $n^3$, see Fig. 7. The inner edge of said end portion is adapted to form with the corresponding part $f'$ of the female die shearing cutters; the arrangement being such that the point of cutter $n$ upon coming in contact with the sheet-metal commences to slit or shear the stock and at the same time to gradually bend the thus cut portion downwardly; the heel $n^3$ in its downward movement not only completes the cutting of the stock but bends it at substantially right angles with the plane of the die-face. At practically the same instant that the teeth are thus bent or immediately thereafter the cutting edge $t'$ of the end blocks $t$ (Figs. 6 and 8) secured in the male die, coact with the corresponding parts $f^3$ of the female die to sever the fastener from the stock-strip. The dotted lines, Fig. 5, show the thus formed fastener lying upon the die $f$. It will be seen that the die $m$ may be readily adjusted to produce fasteners having multiple numbers of the teeth or prongs, by simply employing a corresponding number of cutters $n$. These latter are, as drawn, provided with a groove or notch $n^4$ at its upper end, a T-headed space-block $h$, or a similarly shaped end block $t$ fitting between them, while removable side checks $c^3$ at the bottom of the die-holder serve to keep all the parts firmly in place. When a four-prong fastener (Fig. 2) is to be produced the dies $m$ and $f$ are constructed as shown in Figs. 9 and 12, respectively. In this case blank space-blocks $c$ having a width equal to that of a cutter $n$ may be used to fill out the die-holder, end caps $c'$ being employed to clamp all in position. The fasteners are liable to adhere to the cutters $n$, and in order to detach them therefrom I may employ any well-known clearer or knock-off device. In Fig. 6 I have represented a spring-resisted rod $k$ extending vertically through the center of the die $m$. Obviously the rod is forced through the center block $t^3$ upon engagement with any suitable stop, thereby forcibly detaching the fastener from the die whence it drops into any conveniently placed receptacle. The fasteners when thus dropped from the die $m$ it will be seen have been practically completed during a single reciprocation of the die, and it only remains to incline the teeth from the plane of the perpendicular to fully complete the fastener for use. This is accomplished by a pair of novel setting dies; the bottom or female die $e$ (Fig. 14) is provided with a seat $e'$ in which the fastener, inverted, is placed, see dotted lines, and the upper or male die $b$ forced downwardly upon it thereby deflecting the prongs inwardly, or past the plane of the perpendicular; the amount or degree of such inclination being determined by the form and arrangement of the cone-shaped bending cavities $i$. The die proper is fastened into the holder $b'$ by means of set-screws $d^3$. A movable rod or clearing device $d$, substantially as before described, being employed to dislodge the fasteners from the die $b$. I would state that this last named die will form the subject of another application for Letters Patent to be subsequently filed by me in the United States Patent Office.

A finished fastener A made of sheet-metal as produced by the foregoing instrumentalities is represented in Fig. 1; a similar fastener having but four prongs is shown in Fig. 2. The same is provided with a table or base portion $p$, and obliquely arranged prongs $p'$ inclined from the plane of the perpendicular.

From the foregoing it will be apparent that upon properly feeding the end of the stock-strip $a$ to the dies $f$, $m$, and depressing the latter die the corresponding portion of the stock will thus at one operation be converted into a completed fastener, except the act of deflecting the teeth inwardly past the plane of the perpendicular; this latter, however, is effected by a single act or step upon forcing the prongs into the inclined cavities of the die $b$; the operation being to bend all the teeth simultaneously.

It is found desirable at times to use fasteners having a bent or curved base. I have, in Fig. 16, represented a pair of dies $b$, $e$, adapted to transform the flat fastener-base into a curved shape simultaneously with the act of deflecting the fastener prongs inwardly. In such case the seat $e'$ of the stationary die $e$ may be made concave and the corresponding face of the male die $b$ convex, as clearly shown in said figure. Fig. 17 represents an end view of the fastener thus bent.

I claim as my invention and desire to secure by United States Letters Patent—

1. In a machine for making sheet-metal belt-fasteners, a suitably mounted male die having a series of side and end cutters removably secured therein, and a clearer or knock-out device connected with the die, in combination with a fixed or female die having shear members adapted to coact with the said cutters of the male die, constructed and arranged whereby a single reciprocation of the male die slits the edges of the sheet-metal stock, bends such cut portion downwardly to form teeth, severs the fastener from the stock strip and detaches it from the die, substantially as described.

2. In a machine for making belt-fasteners from a continuous strip of sheet-metal, a single pair of male and female dies for cutting the stock, bending the same to form teeth, severing it from the parent strip and removing it from the dies, in combination with a single pair of dies for inclining the previously bent teeth from the plane of the perpendicular, and automatically detaching the fastener from the dies, substantially as hereinbefore described.

3. The combination with a fixed or female die $f$ having serrated cutting sides and cutting ends, of the male die $m$ having interchangeable side cutters and end cutters arranged to coact with said cutting sides and ends of the female die to simultaneously slit the edges of sheet-metal stock obliquely and bend such slitted portion to form teeth and to sever the fastener from the stock, and means for removably securing the several cutting parts of the die in place, substantially as described.

4. In mechanism for making sheet-metal belt-fasteners, the combination with a female die having side and end portions arranged for cutting, of the male die having removably secured interchangeable side cutters $n$, the working face $n^2$ of each being inclined and terminating in a rounded heel $n^3$, thereby forming with said side portions of the female die combined shearing and bending members, and end cutters $t$ mounted in the male die arranged to coact with the end portions of the female die to sever the thus bent pronged fastener from the strip of stock after the said side cutters have practically completed their work, substantially as described.

In testimony whereof I have affixed my signature in presence of two witnesses.

WALTER O. TALCOTT.

Witnesses:
GEO. H. REMINGTON,
IDA M. WARREN.